United States Patent
Snyder et al.

(10) Patent No.: US 9,863,257 B2
(45) Date of Patent: Jan. 9, 2018

(54) ADDITIVE MANUFACTURED INSEPARABLE PLATFORM DAMPER AND SEAL ASSEMBLY FOR A GAS TURBINE ENGINE

(71) Applicant: UNITED TECHNOLOGIES CORPORATION, Hartford, CT (US)

(72) Inventors: Daniel A Snyder, Manchester, CT (US); Edwin Otero, Southington, CT (US); Lexia Kironn, Rocky Hill, CT (US); Wendell V Twelves, Jr., Glastonbury, CT (US); Evan Butcher, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 352 days.

(21) Appl. No.: 14/613,724

(22) Filed: Feb. 4, 2015

(65) Prior Publication Data

US 2016/0222798 A1 Aug. 4, 2016

(51) Int. Cl.
| | |
|---|---|
| F01D 5/10 | (2006.01) |
| F01D 5/22 | (2006.01) |
| F01D 11/00 | (2006.01) |
| B22F 7/00 | (2006.01) |
| F01D 25/06 | (2006.01) |
| B33Y 80/00 | (2015.01) |
| B29C 64/153 | (2017.01) |

(52) U.S. Cl.
CPC ............ *F01D 5/22* (2013.01); *B22F 7/00* (2013.01); *F01D 11/006* (2013.01); *F01D 11/008* (2013.01); *F01D 25/06* (2013.01); *B29C 64/153* (2017.08); *B33Y 80/00* (2014.12); *F05D 2230/22* (2013.01); *F05D 2260/96* (2013.01)

(58) Field of Classification Search
CPC .......... F01D 25/06; F01D 11/006; F01D 5/22; F01D 5/10; F01D 11/008; B22F 7/00; B22F 5/009; B29C 64/153
See application file for complete search history.

(56) References Cited

U.S. PATENT DOCUMENTS

| | | | | |
|---|---|---|---|---|
| 5,228,835 | A | * | 7/1993 | Chlus ................. F01D 5/22 |
| | | | | 416/193 A |
| 5,573,375 | A | * | 11/1996 | Barcza ................. F01D 11/008 |
| | | | | 416/190 |
| 5,827,047 | A | * | 10/1998 | Gonsor ................. F01D 5/22 |
| | | | | 416/193 A |
| 5,924,699 | A | * | 7/1999 | Airey ................. F01D 11/008 |
| | | | | 277/411 |
| 7,121,800 | B2 | | 10/2006 | Beattie |
| 7,918,265 | B2 | | 4/2011 | Verner et al. |
| 8,011,892 | B2 | | 9/2011 | Ramlogan et al. |
| 8,167,566 | B2 | | 5/2012 | Howes et al. |
| 8,393,869 | B2 | | 3/2013 | Kim et al. |

(Continued)

OTHER PUBLICATIONS

European search report for Application No. 15197568.7-1610 dated May 31, 2016.

*Primary Examiner* — Umashankar Venkatesan
(74) *Attorney, Agent, or Firm* — Bachman & LaPointe, P.C.

(57) ABSTRACT

A damper-seal assembly for a gas turbine engine includes an additively manufactured seal and an additively manufactured damper inseparably assembled with the additively manufactured seal.

22 Claims, 6 Drawing Sheets

(56) References Cited

U.S. PATENT DOCUMENTS

| | | | |
|---|---|---|---|
| 8,672,626 B2 * | 3/2014 | Boy | F01D 5/26 416/1 |
| 9,175,570 B2 | 11/2015 | Propheter-Hinckley et al. | |
| 9,192,999 B2 | 11/2015 | Carter et al. | |
| 2003/0044284 A1 | 3/2003 | Leeke et al. | |
| 2004/0086387 A1 | 5/2004 | Fitts et al. | |
| 2005/0095129 A1 | 5/2005 | Benjamin et al. | |
| 2006/0056974 A1 | 3/2006 | Beattie | |
| 2006/0056975 A1 | 3/2006 | Honkomp et al. | |
| 2009/0004013 A1 | 1/2009 | Ramlogan et al. | |
| 2013/0276456 A1 | 10/2013 | Propheter-Hinckley et al. | |
| 2013/0323031 A1 * | 12/2013 | Zhang | F01D 5/22 415/173.1 |
| 2015/0001093 A1 | 1/2015 | Carter et al. | |
| 2016/0045967 A1 | 2/2016 | Carter et al. | |

* cited by examiner

ADDITIVE MANUFACTURED INSEPARABLE PLATFORM DAMPER AND SEAL ASSEMBLY FOR A GAS TURBINE ENGINE

STATEMENT REGARDING FEDERALLY SPONSORED RESEARCH OR DEVELOPMENT

This disclosure was made with Government support under FA8650-09-D-2923-0021 awarded by The United States Air Force. The Government has certain rights in this disclosure.

BACKGROUND

This application relates generally to a turbine seal and damper assembly and specifically to an additively manufactured inseparable seal and damper assembly.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases.

The turbine section includes rotatable turbine blade and stationary turbine vane arrays. Each of the turbine blades is spaced apart from an adjacent turbine blade to accommodate movement and expansion during operation. The turbine blades typically include a root that attaches to a rotor disk, a platform, and an airfoil that extends radially outwardly from the platform.

Hot combustion gases that flow over the platform are prevented from leaking between adjacent turbine blades by a seal, as components below the platform are generally not designed to operate for extended durations exposed to the elevated temperatures of the hot combustion gases. In addition to the seal, a damper between adjacent turbine blades dissipates vibration through frictional contact between the damper and an underplatform surface of the two adjacent turbine blade platforms.

Support of dampers within blade assemblies is typically accomplished with posts and shelf features on the blades or rotor disk. Although effective, these features may cause undesirable stress concentrations.

SUMMARY

A damper-seal assembly for a gas turbine engine according to one disclosed non-limiting embodiment of the present disclosure includes an additively manufactured seal and an additively manufactured damper inseparably assembled with the additively manufactured seal.

A further embodiment of the present disclosure includes, wherein the additively manufactured seal includes a first strap that extends generally flush with a top surface of the additively manufactured seal.

A further embodiment of any of the foregoing embodiments of the present disclosure includes a second strap and a third strap generally parallel to the first strap and displaced therefrom to form a damper retention area generally therebetween for entrapment of the additively manufactured damper.

A further embodiment of any of the foregoing embodiments of the present disclosure includes, wherein the additively manufactured damper includes a platform rub surface with a groove formed therein opposite an undersurface of a main body, the groove at least partially receives the first strap.

A further embodiment of any of the foregoing embodiments of the present disclosure includes a first wing and a second wing that extend from the main body generally parallel to the groove and are of a length greater than that of the damper retention area.

A further embodiment of any of the foregoing embodiments of the present disclosure includes, wherein the additively manufactured damper is assembled to the seal to slide relative thereto.

A further embodiment of any of the foregoing embodiments of the present disclosure includes, wherein the additively manufactured damper is generally "H" shaped.

A further embodiment of any of the foregoing embodiments of the present disclosure includes, wherein the additively manufactured seal has non-constant thickness.

A further embodiment of any of the foregoing embodiments of the present disclosure includes, wherein the additively manufactured seal conforms to a cavity within a turbine blade.

A damper-seal assembly for a gas turbine engine according to another disclosed non-limiting embodiment of the present disclosure includes a damper inseparably assembled with a seal, at least one of the seal and the damper additively manufactured.

A further embodiment of any of the foregoing embodiments of the present disclosure includes, wherein the seal includes a first strap received within a groove in the damper.

A further embodiment of any of the foregoing embodiments of the present disclosure includes, wherein the seal includes a first strap, a second strap, and a third strap, the second strap and the third strap generally parallel to the first strap and displaced therefrom to form a damper retention area generally therebetween for entrapment of the damper.

A further embodiment of any of the foregoing embodiments of the present disclosure includes, wherein the damper includes a platform rub surface with a groove formed therein opposite an undersurface of a main body, the groove at least partially receives a first strap of the damper, a second strap, and a third strap, generally parallel to the first strap for entrapment of the damper within a damper retention area.

A further embodiment of any of the foregoing embodiments of the present disclosure includes a first wing and a second wing that extend from the main body generally parallel to the groove and are of a length greater than that of the damper retention area.

A further embodiment of any of the foregoing embodiments of the present disclosure includes, wherein the additively manufactured damper is assembled to the seal to slide relative thereto.

A turbine assembly according to another disclosed non-limiting embodiment of the present disclosure includes a first turbine blade circumferentially adjacent to a second turbine blade, the first turbine blade includes a first platform with a first underplatform surface, the second turbine blade includes a second platform with a second underplatform surface, the first underplatform surface and the second underplatform surface at least partially defines a cavity; an additively manufactured damper inseparably assembled with an additively manufactured seal, the additively manufactured damper interfaces with the first underplatform surface and the second underplatform surface.

A further embodiment of any of the foregoing embodiments of the present disclosure includes, wherein the additively manufactured damper is assembled to the seal to slide relative thereto.

A further embodiment of any of the foregoing embodiments of the present disclosure includes, wherein the additively manufactured seal includes a first strap that extends generally flush with a top surface of the additively manufactured seal.

A further embodiment of any of the foregoing embodiments of the present disclosure includes a second strap and a third strap generally parallel to the first strap and displaced therefrom to form a damper retention area generally therebetween for entrapment of the additively manufactured damper.

A further embodiment of any of the foregoing embodiments of the present disclosure includes, wherein the additively manufactured damper includes a platform rub surface with a groove formed therein opposite an undersurface of a main body, the groove at least partially receives the first strap.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
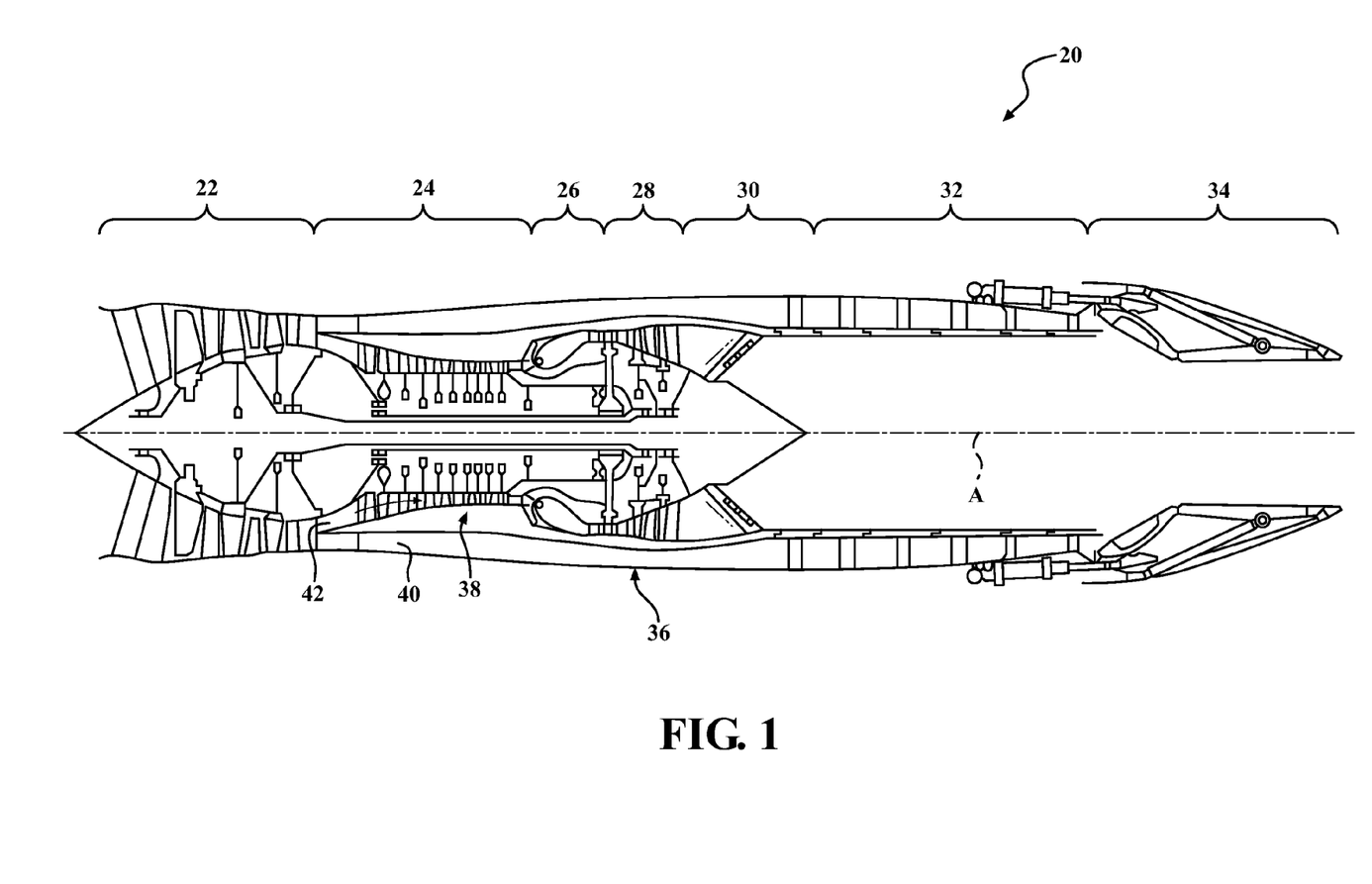
FIG. 1 is a schematic cross-section of one example aero gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be appreciated that the concepts described herein are applicable to other gas turbine engine architectures to include non-augmented engines, geared architecture engines, direct drive turbofans, turbojet, turboshaft, multi-stream variable cycle adaptive engines, and others.

An engine case structure 36 defines a generally annular secondary airflow path 40 around a core airflow path 42. Various modules may define the engine case structure 36 that essentially defines an exoskeleton to support the rotational hardware.

Air that enters the fan section 22 is divided between a core airflow through the core airflow path 42, and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be provided.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to, for example, the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Figure 2:
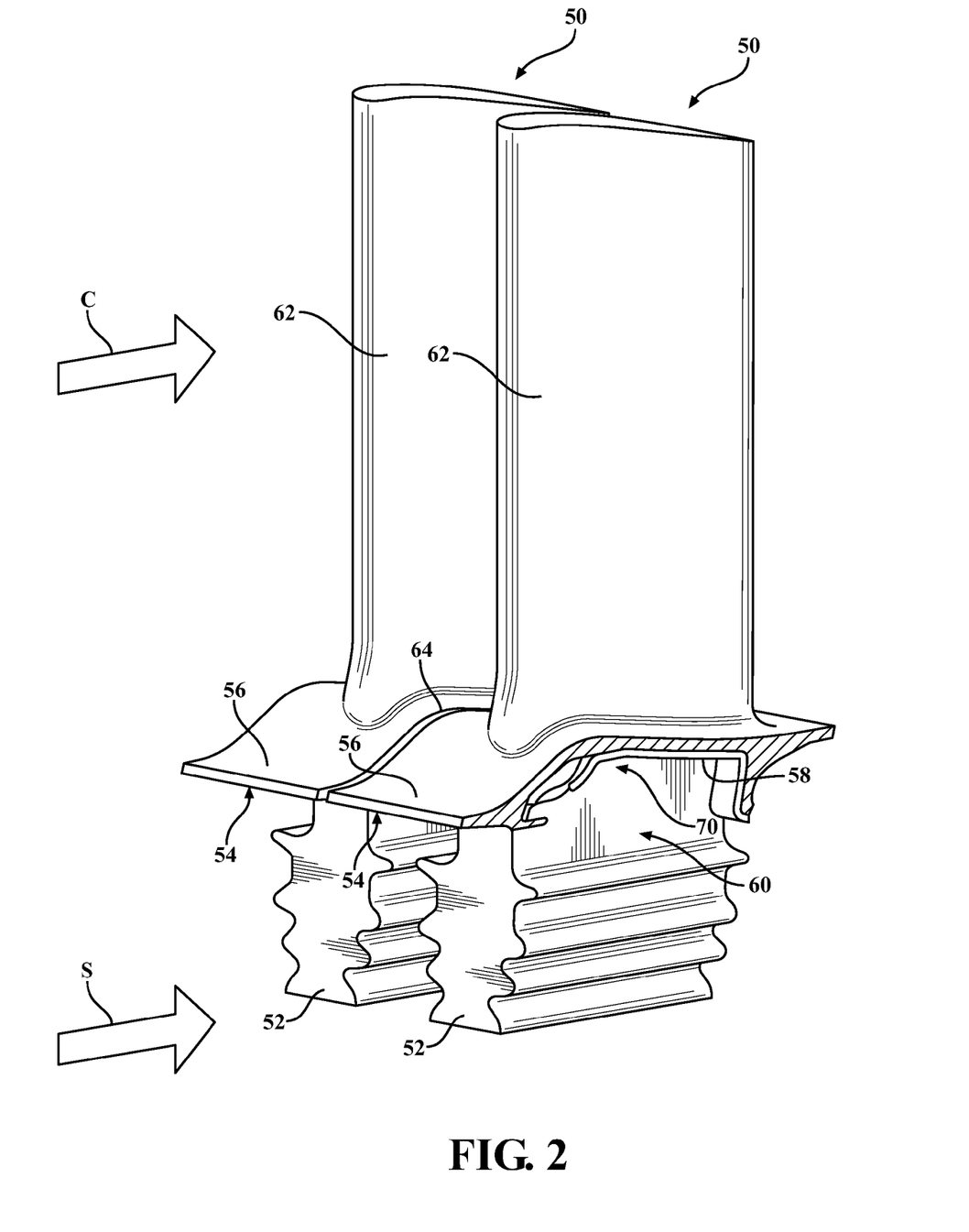
FIG. 2 is a perspective view of a damper seal assembly between two turbine blades.

With reference to FIG. 2, the turbine section 28 includes an array of turbine blades 50 (only two shown). Each of the turbine blades 50 includes a root 52 that is fit into a radial slot of a rotor disk (not shown). Radially outward of the root 52 is a platform 54 that includes a platform outer surface 56, and an underplatform surface 58. The underplatform surface 58 is disposed radially inward of the outer surface 56 to at least partially surround a cavity 60. An airfoil 62 extends from the platform 54.

Core combustion gases (illustrated schematically by arrow C) flow around the airfoil 62 and over the platform 54 while the secondary airflow (illustrated schematically by arrow S) flows under the platform 54. A gap 64 extends axially between adjacent platforms 54 to accommodate thermal expansion.

Figure 3:
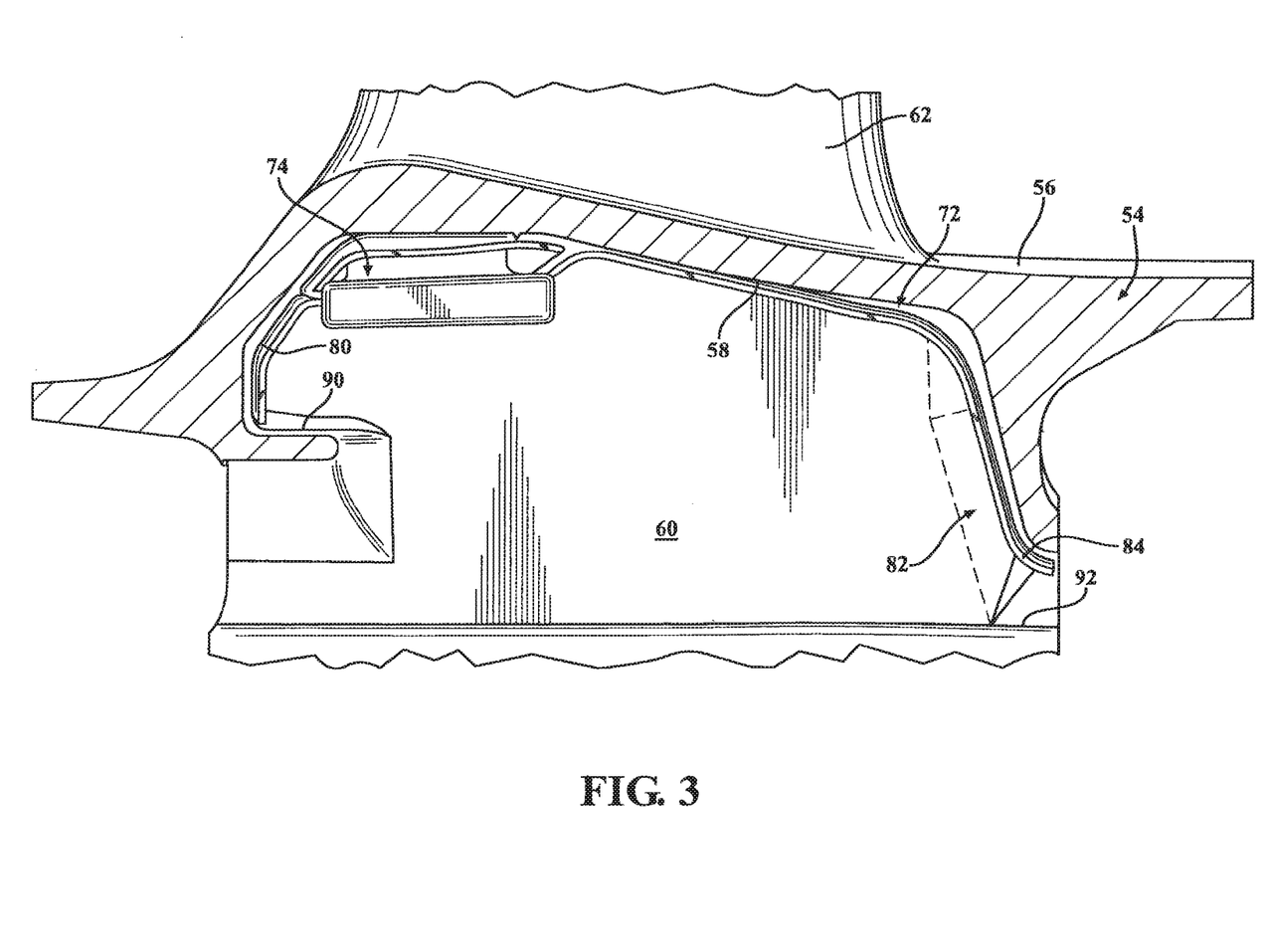
FIG. 3 is a side view of the damper seal assembly within a cavity.

With reference to FIG. 3, an inseparable damper-seal assembly 70 includes a seal 72 that minimize secondary airflow leakage through the gap 64, and a damper 74 to damp vibrations. The inseparable damper-seal assembly 70 is positioned at least partially within the cavity 60 formed between each two adjacent turbine blades 50 to abut the respective underplatform surfaces 58.

The inseparable damper-seal assembly 70 is located within the cavity 60 such that frictional contact between the damper 74 and the underplatform surface 58 absorbs and dissipates vibrational energy generated during engine operation. That is, the damper 74 is placed against the underplatform surface 58 under centrifugal loading.

Figure 4:
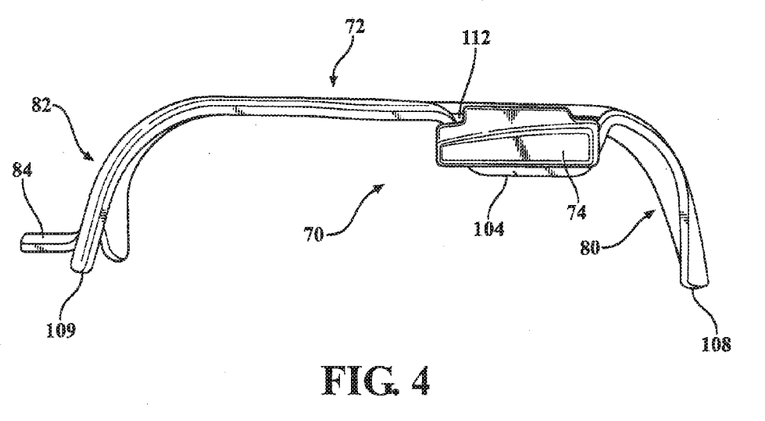
FIG. 4 is a side view of the damper seal assembly.
Figure 5:
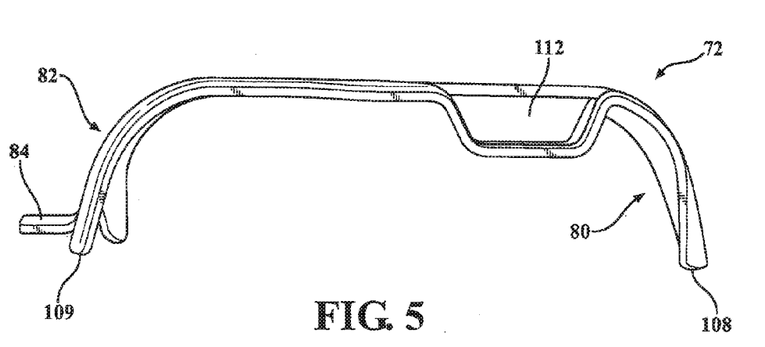
FIG. 5 is a side view of the seal according to one disclosed non-limiting embodiment.
Figure 6:
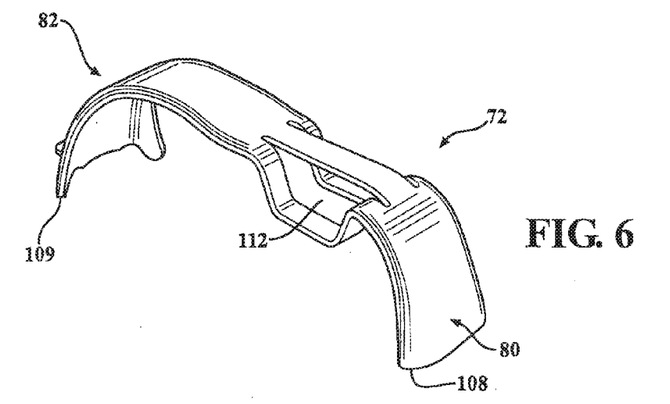
FIG. 6 is a front perspective view of the seal according to one disclosed non-limiting embodiment.
Figures 7, 8:
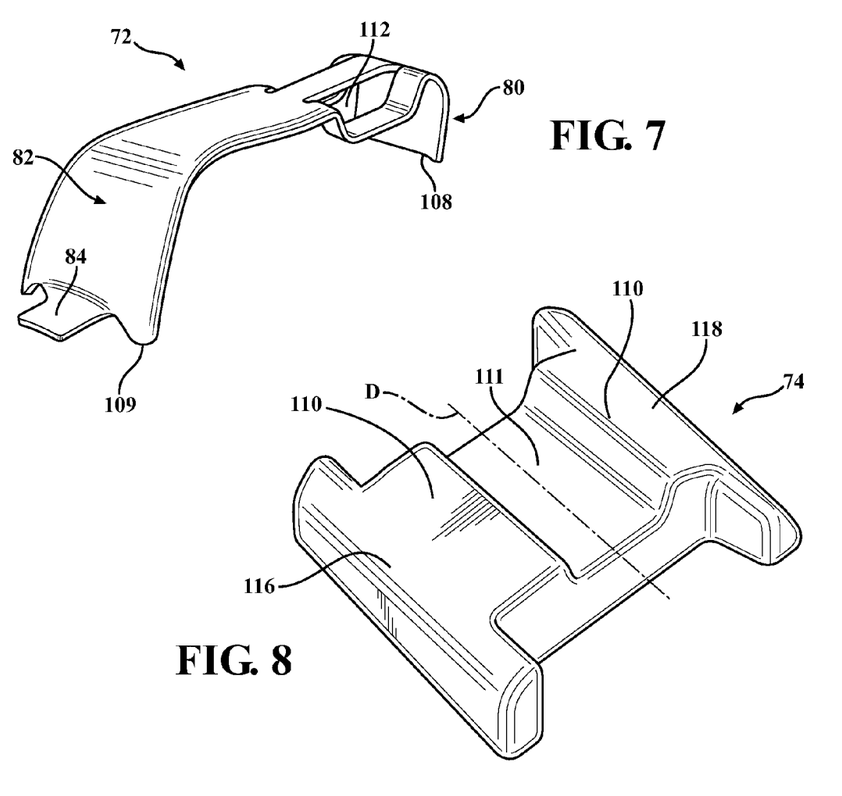
FIG. 7 is a rear perspective view of the seal assembly.
FIG. 8 is a top perspective view of the damper according to another disclosed non-limiting embodiment.
Figure 9:
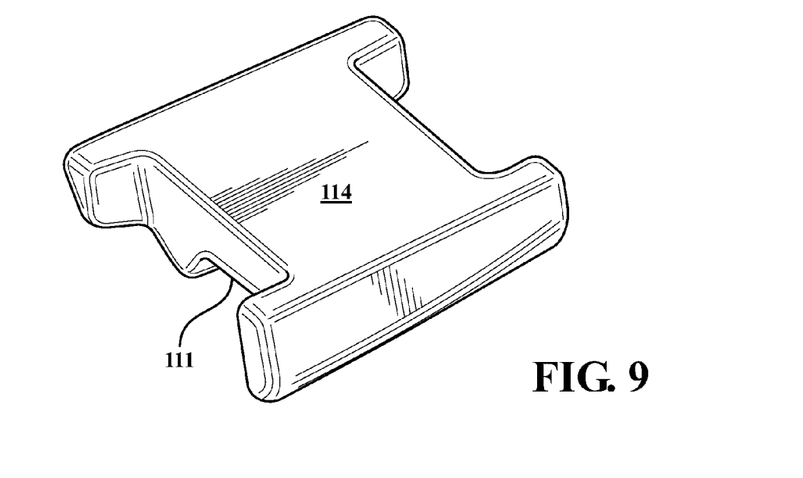
FIG. 9 is a bottom perspective view of the damper according to another disclosed non-limiting embodiment.

With reference to FIG. 4, the inseparable damper-seal assembly 70 in one disclosed non-limiting embodiment generally includes the seal 72 (FIGS. 5-7) and the damper 74 (FIGS. 8-9) that are additively manufactured together to form an inseparable assembly. It should be appreciated that although particular components and/or assemblies are separately defined each, or any, may be otherwise combined or segregated within that referred to inseparable damper-seal assembly 70 such that the assembly is inseparable. For example, the damper is additively manufactured onto a sheet metal seal.

The seal 72 and the damper 74 may be individually or collectively manufactured with an additive manufacturing process that includes but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Laser Powder Bed Fusion (LPBF).

The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

The additive manufacturing process facilitates manufacture of the relatively complex internal geometry to minimize assembly details and multi-component construction. The additive manufacturing process fabricates or "grows" components using three-dimensional information, for example a three-dimensional computer model. The three-dimensional information is converted into a plurality of slices, each slice defining a cross section of the component for a predetermined height of the slice. The additive manufactured component is then "grown" slice by slice, or layer by layer, until finished. Although particular additive manufacturing processes are disclosed, it should also be appreciated that any other suitable rapid manufacturing methods using layer-by-layer construction or additive fabrication can alternatively be used. It should be appreciated that although the seal 72 and the damper 74 may be individually described in detail herein, the seal 72 and the damper 74 are collectively manufactured with an additive manufacturing process as an inseparable assembly.

With continued reference to FIG. 4, the seal 72 generally includes a forward portion 80 and an aft portion 82. The material utilized for the seal 72 is selected to withstand the pressures and temperatures associated with a specific application and may allow some plastic deformation responsive to the thermal and centrifugal loads to conform and fit the contours of the underplatform surface 58. In one example, the seal 72 is about 0.010"-0.030" (0.25-0.8 mm) thick. The plastic deformation facilitates a desired seal between the underplatform surface 58 of the adjacent turbine blades 50.

The forward portion 80 may be at least partially supported on a ledge 90 of the cavity 60 (FIG. 3). The aft portion 82 of the seal 72 extends axially rearward and inboard to conform with the underplatform surface 58. That is, the forward portion 80 and the aft portion 82 conforms to the underplatform surface 58 of each two adjacent turbine blades 50 to bridge the gap 64 therebetween. In this embodiment, the aft portion 82 includes a tab 84 that is respectively received within a slot 92 in the cavity 60 (FIG. 3). That is, the ledge 90 and the slot 92 operate to retain the seal 72 even when no centrifugal loads are being applied.

Figure 10:
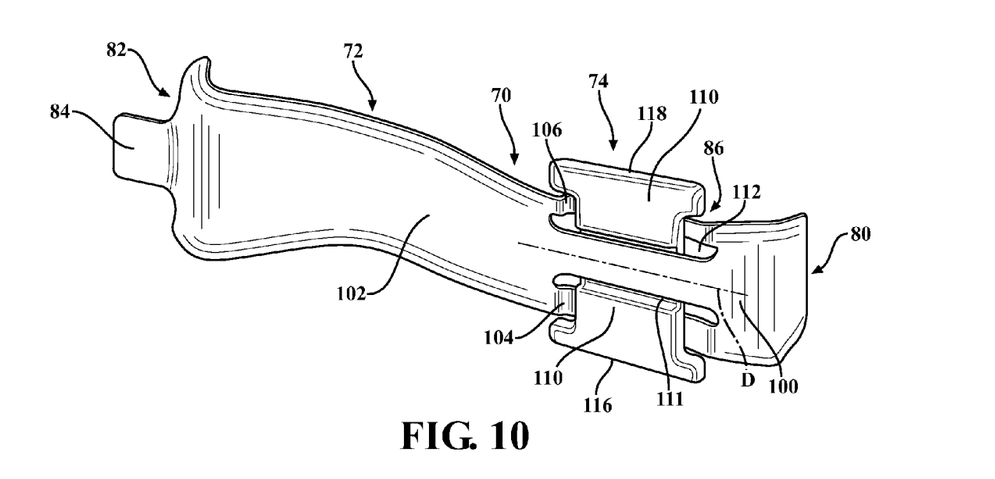
FIG. 10 is a top view of the damper seal assembly.

With reference to FIG. 10, the seal 72 further includes a damper interface portion 86 between the forward portion 80 and the aft portion 82. The damper interface portion 86 generally follows an upper surface of the cavity 60 between the forward portion 80 and the aft portion 82 which curve relative thereto.

The damper interface portion 86 generally includes a first strap 100 that extends generally flush with a seal top surface 102. A second strap 104 and a third strap 106 flank the first strap 100 and extend parallel thereto (also shown in FIG. 11). The second strap 104 and the third strap 106 are also displaced relative to the first strap 100, toward a distal end 108, 109 of the respective forward portion 80 and the aft portion 82. The first strap 100, the second strap 104 and the third strap 106 thereby form a damper retention area 112 (best seen in FIGS. 5-7) for entrapment of the damper therein. That is, the damper 74 is additively manufactured within the damper retention area 112 while the seal 72 is additively manufactured to form the inseparable assembly as this configuration cannot otherwise be produced from sheet metal due to high in-plane forming strains (stretching rather than bending).

The straps 100, 104, 106 lend themselves to additive manufacturing because there does not exist a flat pattern that could readily produce these straps through bending. The additively manufactured seal 72 may also have a conformal shape, e.g., non-constant thickness that is not available with conventional manufacturing methods such as sheet metal forming such that the seal 72 itself may have a mass distribution that is tunable via the variable thickness.

Figure 11:
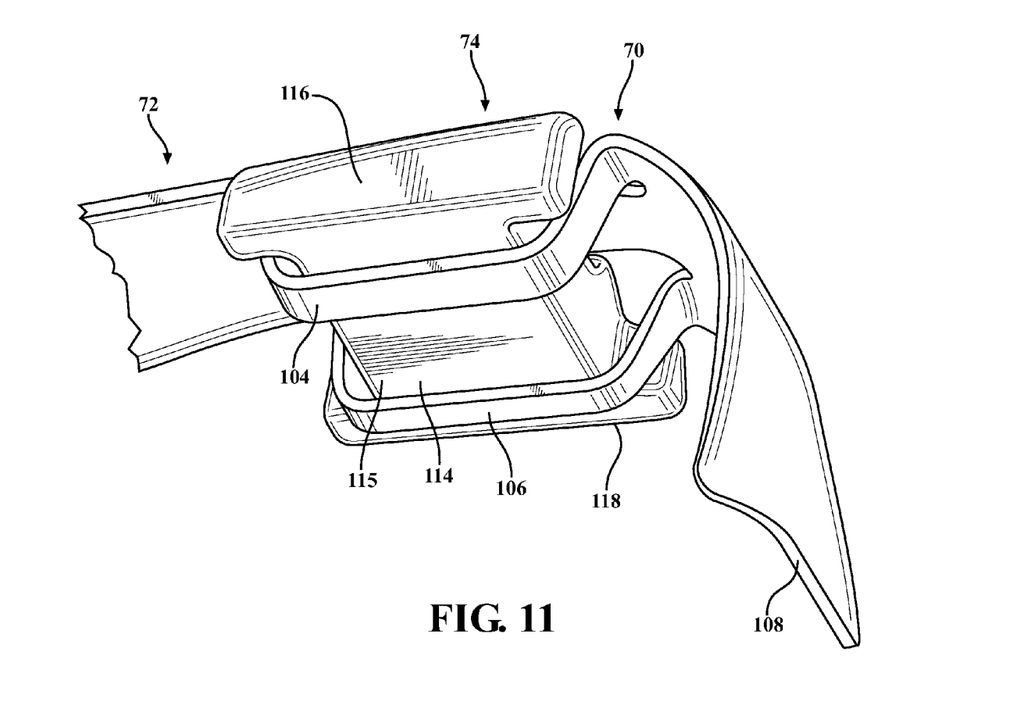
FIG. 11 is a bottom view of the damper seal assembly.

With continued reference to FIG. 10, the damper 74 generally includes a platform rub surface 110 with a groove 111 formed therein opposite an undersurface 114 of a main body 115 (best seen in FIG. 11). A first wing 116 and a second wing 118 extend from the main body 115 generally parallel to the groove 111 and are of a length greater than that of the damper retention area 112 such that the damper 74 is entrapped therein to form the inseparable assembly. The damper 74 is a unitary additively manufactured component in which the wings 116, 118 extend from the main body 115 in a generally "H" shape in which the horizontal part of the "H" extends transverse to the first strap 100, the second strap 104, and the third strap 106.

The damper 74 is fabricated from a material that essentially does not plastically deform under the thermal and centrifugal loads produced during engine operation to provide a dense rigid structure to facilitate slippage of the damper 74 at its contact surfaces absorb vibrational energy. That is, it the damper 74 were not stiff enough, the damper 74 may elastically deform and not slide. Further, the material utilized for the damper 74 is selected to provide desired frictional properties in addition to the thermal capacity. As the damper 74 is additively manufactured, the damper 74 may have a surface finish generally equivalent to that of an as-cast component, e.g., 125 Ra, which facilitates a frictional interface between the platform rub surface 110 and the underplatform surface 58 since the performance of the damper depends on the surface finish of the contact surfaces.

The damper 74 is entrapped between the first strap 100, the second strap 104, and the third strap 106 but may slide along an axis D defined by the groove 111. Such sliding movement further facilitates damping of vibration by allowing the damper 74 to find its own position to maximize vibration reduction.

The inseparable damper-seal assembly 70 allows for retention of the damper 84 without use of damper posts within the cavity 60, yet still permits the damper 74 to be loosely supported between blades and engage in frictional contact with the underside of blade platforms during blade resonance. The position of the damper 74 is thus optimized to contact an area of the under platform 58 with relatively high vibratory displacement in order to efficiently remove vibratory energy from the system.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A damper-seal assembly for a gas turbine engine comprising:
   an additively manufactured seal that forms a damper retention area; and
   an additively manufactured damper entrapped in the damper retention area to form an inseparable assembly with said additively manufactured seal.

2. The assembly as recited in claim 1, wherein said additively manufactured seal includes a first strap that extends generally flush with a top surface of said additively manufactured seal.

3. The assembly as recited in claim 2, further comprising a second strap and a third strap generally parallel to said first strap and displaced therefrom, to form the damper retention area generally therebetween.

4. The assembly as recited in claim 2, wherein said additively manufactured damper includes a platform rub surface with a groove formed therein opposite an undersurface of a main body, said groove at least partially receives said first strap.

5. The assembly as recited in claim 4, further comprising a first wing and a second wing that extend from said main body generally parallel to said groove and are of a length greater than that of said damper retention area.

6. The assembly as recited in claim 1, wherein said additively manufactured damper is assembled to said seal to slide relative thereto.

7. The assembly as recited in claim 1, wherein said additively manufactured damper is generally "H" shaped.

8. The assembly as recited in claim 1, wherein said additively manufactured seal has non-constant thickness.

9. The assembly as recited in claim 1, wherein said additively manufactured seal conforms to a cavity within a turbine blade.

10. A damper-seal assembly for a gas turbine engine comprising:
    a damper inseparably assembled with a seal, at least one of said seal and said damper additively manufactured.

11. The assembly as recited in claim 10, wherein said seal includes a first strap received within a groove in said damper.

12. The assembly as recited in claim 10, wherein said seal includes a first strap, a second strap, and a third strap, said second strap and said third strap generally parallel to said first strap and displaced therefrom to form a damper retention area generally therebetween for entrapment of said damper.

13. The assembly as recited in claim 10, wherein said damper includes a platform rub surface with a groove formed therein opposite an undersurface of a main body, said groove at least partially receives a first strap of said damper, a second strap, and a third strap, generally parallel to said first strap for entrapment of said damper within a damper retention area.

14. The assembly as recited in claim 13, further comprising a first wing and a second wing that extend from said main body generally parallel to said groove and are of a length greater than that of said damper retention area.

15. The assembly as recited in claim 10, wherein said additively manufactured damper is assembled to said seal to slide relative thereto.

16. A turbine assembly comprising:
    a first turbine blade circumferentially adjacent to a second turbine blade, said first turbine blade includes a first platform with a first underplatform surface, said second turbine blade includes a second platform with a second underplatform surface, said first underplatform surface and said second underplatform surface at least partially defines a cavity;
    an additively manufactured damper additively manufactured onto a sheet metal seal, said additively manufactured damper interfaces with said first underplatform surface and said second underplatform surface, said additively manufactured damper entrapped in said sheet metal seal to form an inseparable assembly.

17. The assembly as recited in claim 16, wherein said additively manufactured damper is assembled to said seal to slide relative thereto.

18. The assembly as recited in claim 17, wherein said additively manufactured seal includes a first strap that extends generally flush with a top surface of said additively manufactured seal.

19. The assembly as recited in claim 18, further comprising a second strap and a third strap generally parallel to said first strap and displaced therefrom to form a damper retention area generally therebetween for entrapment of said additively manufactured damper.

20. The assembly as recited in claim 19, wherein said additively manufactured damper includes a platform rub surface with a groove formed therein opposite an undersurface of a main body, said groove at least partially receives said first strap.

21. The assembly as recited in claim 10, wherein said additively manufactured damper is additively manufactured onto a sheet metal seal.

22. A damper-seal assembly for a gas turbine engine comprising: an additively manufactured seal comprising a first strap, a second strap and a third strap that forms a damper retention area; and an additively manufactured damper comprising a platform rub surface with a groove formed therein opposite an undersurface of a main body, the groove receives the first strap, a first wing, and a second wing extends from said main body generally parallel to said groove, said first wind and said second wing of a length greater than that of a damper retention area that receives the second strap and the third strap such that said additively manufactured damper is entrapped in the damper retention area to form an inseparable assembly with said additively manufactured seal.

\* \* \* \* \*